(12) United States Patent
Tsiounis

(10) Patent No.: US 9,089,767 B2
(45) Date of Patent: Jul. 28, 2015

(54) METHODS AND APPARATUS FOR FACILITATING A GAME COMPRISING PLACEMENT OF ELEMENTS IN A PREDETERMINED RELATIONSHIP

(71) Applicant: Ioannis Spyridon Tsiounis, New York, NY (US)

(72) Inventor: Ioannis Spyridon Tsiounis, New York, NY (US)

( * ) Notice: Subject to any disclaimer, the term of this patent is extended or adjusted under 35 U.S.C. 154(b) by 150 days.

(21) Appl. No.: 13/875,260

(22) Filed: May 1, 2013

(65) Prior Publication Data

US 2013/0310125 A1 Nov. 21, 2013

Related U.S. Application Data

(60) Provisional application No. 61/649,457, filed on May 21, 2012.

(51) Int. Cl.
| | |
|---|---|
| *A63F 9/24* | (2006.01) |
| *A63F 13/00* | (2014.01) |
| *A63F 13/35* | (2014.01) |
| *A63F 3/04* | (2006.01) |
| *A63F 3/00* | (2006.01) |
| *G09B 19/02* | (2006.01) |

(52) U.S. Cl.
CPC .............. *A63F 13/00* (2013.01); *A63F 3/00643* (2013.01); *A63F 3/0415* (2013.01); *A63F 9/24* (2013.01); *A63F 13/35* (2014.09); *G09B 19/02* (2013.01); *A63F 2003/0418* (2013.01)

(58) Field of Classification Search
CPC ............................... A63F 3/00643; G07F 7/32
See application file for complete search history.

(56) References Cited

PUBLICATIONS

Triolet rules and game board, boardgamegeek.com, Oct. 30, 2008, 2 pages.*
Five-O rules of the game; download date Apr. 30, 2013; 1 pp. Website: www.codevandal.com/games/five-o/; Your Favorite Word Game, Minus the Words; download date: Jul. 29, 2013; 6 pps.
Website: http://triolet.co.uk/; 15 Reasons Why You Will Love Triolet; download date: Jul. 29, 2013; 2 pps.
Website: www.gameoftheyear.co.uk/triolet.html; Triolet In a Nutshell; download date: Jul. 29, 2013; 2 pps.

* cited by examiner

*Primary Examiner* — Omkar Deodhar
(74) *Attorney, Agent, or Firm* — Magdalena M. Fincham; Fincham Downs, LLC

(57) ABSTRACT

In accordance with at least some embodiments, provided are methods, systems and articles of manufacture for facilitating an electronic game comprising a game interface having multiple element positions onto which one or more players places a plurality of game elements in a given move, each game element having a respective numeral indicated thereon or being blank. An acceptable move for the game may comprise (i) placement of a plurality of the game elements in a predetermined positional relationship; and (ii) the numerals of the game elements satisfying a predetermined mathematical relationship (e.g., a (modulo 10) addition or a (modulo 10) difference). A score for an acceptable move may be determined based on the respective numerals of the placed game elements.

20 Claims, 6 Drawing Sheets

US 9,089,767 B2

METHODS AND APPARATUS FOR FACILITATING A GAME COMPRISING PLACEMENT OF ELEMENTS IN A PREDETERMINED RELATIONSHIP

CLAIM OF PRIORITY

The present Application claims the benefit of priority to U.S. Provisional Application Ser. No. 61/649,457, filed on May 21, 2012 in the name of Yiannis Tsiounis and entitled METHODS AND APPARATUS FOR FACILITATING A GAME COMPRISING PLACEMENT OF ELEMENTS IN A PREDETERMINED RELATIONSHIP. The entirety of Provisional Application Ser. No. 61/649,457 is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION(S)

The present application relates to methods, systems and articles of manufacture for facilitating an electronic (e.g., online) game in which, according to some embodiments, a user places elements on a game interface comprising a plurality of element positions, each element comprising a numeral which (i) contributes to a score resulting from the placement and (ii) is evaluated to determine whether the placement of the element satisfies a rule of the game (e.g., whether the numeral bears a predetermined mathematical relationship to the content of one or more adjacent elements).

DETAILED DESCRIPTION OF SOME EMBODIMENTS

Figure 1:
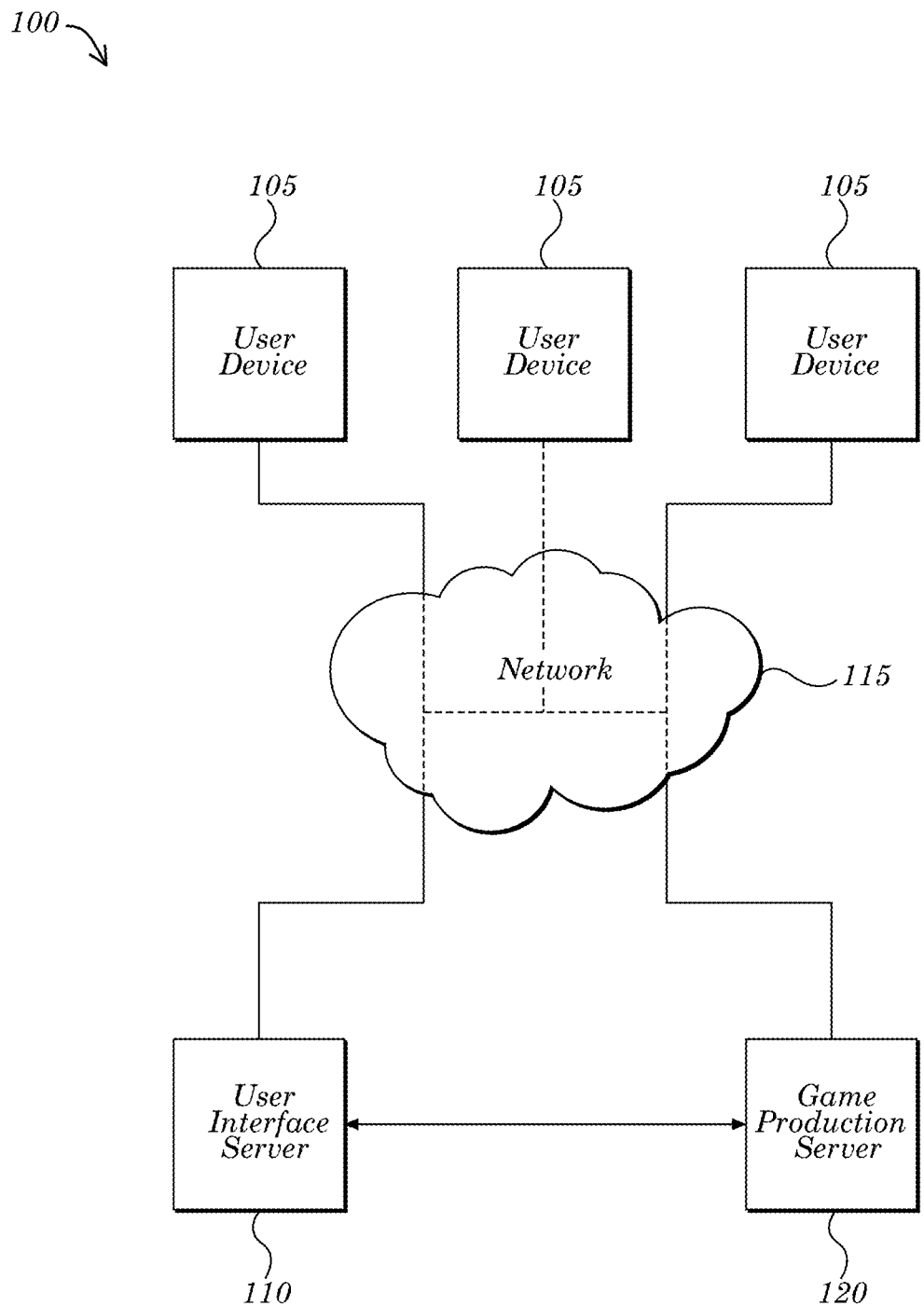
FIG. 1 comprises a block diagram of one example system, in accordance with some embodiments.

Play of electronic games is growing in popularity. There is an ever-present need for new and exciting games which will attract the time and attention of players. Applicant has recognized that games which are both simple for novice players yet complex enough for experienced players are ones which may be particularly likely to attract and maintain the time and attention of a significant number of players.

In accordance with some embodiments, a process, system or article of manufacture provides for facilitating the playing of an electronic game which comprises a game interface having a plurality of positions on which one or more game elements may be placed by one or more players. Each of such game elements may include thereon a representation of, for example, a numeral, alphanumeric symbol and/or other symbols (other than letters) and/or may be blank. Scoring of the game may comprise, in one example embodiment, (i) determining the content (e.g., the numeral indicated thereon) of each of a game element placed on the game interface; (ii) determining the particular position in which the game element was placed and any special scoring rule(s) associated with the position (e.g., is it a "double" position which doubles the value of a game element placed thereon), (iii) determining the content of related elements (e.g., adjacent game elements, elements within another predetermined positional relationship with respect to the subject game element being evaluated and/or other game elements also placed on the game interface by the same player in the current move which is being evaluated); (iv) determining whether the respective content (e.g., numerals) indicated on the subject game element and the related game elements satisfy a required mathematical relationship (e.g., as a (modulo 10) addition relationship); and (v) if the respective content (e.g., numerals) indicated on the subject game element and the related game elements satisfy a required mathematical relationship, calculating a score for the move based on the respective content. Thus, in accordance with some embodiments, for a given move in the game a single numeral on a given game element is used for the dual purpose of (i) determining whether the move is a valid move by determining whether the numeral, when taken in the context of the numerals of the related game elements, satisfies a required mathematical relationship; and (ii) calculating a score for the move.

In embodiments involving numerals or alphanumeric sequences (e.g., embodiments in which the content of elements comprises numbers, and potentially also letters and/or symbols, which must be arranged in a predetermined mathematical relationship on the board), the game may have educational value as it helps teach mathematical operations to the players. This can be as simple as teaching a player how to perform addition and subtraction and perform it fast and accurately, to more complicated functions, depending on the rules of the specific game.

It should be noted that the term "numeral" as used herein unless indicated otherwise, may refer to number or a word, letter, symbol, or figure (or a group of any of the foregoing), expressing a number. For example, a numeral may comprise an Arabic numeral (e.g., 8), a Roman numeral (e.g., IV) or a binary numeral (e.g., 110).

In some embodiments, placement or arrangement of game elements on element positions on the game interface may be rejected by a processor facilitating the game if the content of the placed elements does not satisfy a predetermined rule specifying a predetermined relationship the content of the elements must bear to one another. One example predetermined relationship consistent with some embodiments comprises a predetermined mathematical relationship, such as a (modulo 10) addition relationship) of a predetermined number of game elements in a predetermined positional relationship (3 game elements in a continuous vertical, horizontal or diagonal line). Rejection of a placement or move by a processor may comprise, for example, (i) assigning a score of zero to the move; (ii) disallowing further progress in the game pending the removal from the game interface of the offending game element(s); (iii) removing the offending game element(s) from the game interface on behalf of the player; and/or (iv) outputting a message indicating that the offending game elements do not satisfy a rule or requirement of the game (or offend a restriction of the game) and disallowing a further move or progress in the game pending removal of the offending game element(s).

One advantage of some embodiments of the game is that it comprises only a few simple rules, so it is easy to learn and start playing, but at the same time there is a lot of strategy necessary to win, including finding the sequence or arrangement that maximizes the score for a given move, leaves the best possible elements available for the next move, minimizes the probability that the other player(s) will be able to utilize a multiplier square, and so on. Applicant has endeavored to provide at least some game embodiments which are relatively easy for everyone to learn and play, but not boring for the expert player, as mastering them may involve appreciation for and mastering of significant subtle nuances, thus providing for wide appeal.

It should further be noted that a game consistent with embodiments described herein may be a single player or a multi-player game. In one embodiment if a multi-player game, players may play their moves in sequence one after the other. Such moves may be done asynchronously in some embodiments and/or at different times or with significant lags in time between moves of different players. In some embodiments of a single player game the goal is to maximize the score for a given move and the score for the whole game, as well as to experiment with, or be rewarded for, interesting sequences. In some embodiments of a multi-player game the goal is to win, by achieving a higher score than the other players, and/or to create interesting sequences or plays. For example, among a number of players one can be the overall winner but someone else may get bonus points or an honorary mention or some other incentive for achieving the highest single-move score.

In accordance with some embodiments, processes, systems and/or articles of manufacture provide for a setting up of the game, which may include, for example, (i) determining the game interface to be used (e.g., if more than one option is available); (ii) the order in which the player(s) will play the game (e.g., if there is more than one player); (iii) determining, generating or selecting a central pool of game elements from which game elements will be selected (e.g., on a random basis) and output to players participating in the game, for placement on the game interface during the game; and (iv) selecting and outputting a predetermined number (e.g., seven) of game elements from that central pool to each of the player(s).

In accordance with some embodiments, after the setup of a game, processes, systems and/or articles of manufacture provide for (i) determining a move from a first player, such move consisting of placing some of the player's game elements on the game interface, (ii) verifying that the element positions and/or the content of the elements bear a predetermined relationship to each other and/or conform to some mathematical rules in order for the move to be accepted and, (iii) if these verifications succeed, accepting the move and computing a score for the move based on one or more predetermined rules. In accordance with some embodiments, such processes, systems and/or articles of manufacture may further provide for (i) computing the total score for the player who has completed a move, based on one or more predetermined rules, and (ii) selecting new game elements, if still available, from the central pool to the player, as needed, so that the player maintains a certain number of game elements for the next move.

In accordance with some embodiments, processes, systems and/or articles of manufacture provide for (i) rejecting a player's move if it does not satisfy a requirement of the game (e.g., if any of the verifications performed in evaluating the move fail); (ii) maintaining, for the duration of a game and for each respective player participating in the game, a list of the game elements available for placement on the game interface by a given player (e.g., a list of the player's current list of available game elements, output to the player from the central pool of game elements); (iii) maintaining, for the duration of a game, a list of the elements remaining in the central pool; (iv) tracking and updating the score for each respective player after each move of the player; (v) storing, for the duration of the game, other potentially relevant information; (vi) ending the game when certain conditions are satisfied (e.g., less than a predetermined number of game elements remains available in the central pool, less than a predetermined number or arrangement of element positions remains available on the game interface); and/or (vii) determining a winner or other result of the game (e.g., in a multi-player game, determining the player(s) with the highest score to be the winner(s)).

In accordance with some embodiments, the game may be played on a game interface comprising multiple positions for placement of elements, such as an interface representing a grid or tiled board. The game interface may be, for example, rectangular in shape, i.e., with the same number of squares horizontally and vertically, but it can also be non-rectangular. The board can be a two-dimensional board or a three-dimensional board or, using certain mathematical and/or graphical representations, a four-dimensional or higher-dimensional board. The instantiation of the board can be a physical board or an electronic board, the latter instantiated either via a process operating on a multi purpose computing device or on a single purpose computing device built for this game only. The board may also have the possibility to recognize the elements placed on it using a variety of methods, such as RFID communication, touch-sensitive screen, physical characteristics of the element itself, or some other method. Such automated element recognition allows the board to determine the element, give feedback as to its acceptance and placement, and compute the score.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a personal computer online in web browsers, on a game console and/or on a mobile device such as a smart-phone or tablet computer. "Gaming" thus refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration. A wager may comprise a monetary wager in the form of an amount of currency or any other tangible or intangible article having some value which may be risked on an outcome of a wagering game. "Gambling" or "wagering" refers to play of a wagering game.

The term "game provider", as used herein unless specified otherwise, refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version (IPv6) standard as defined by "Internet Protocol Version (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online OR electronic game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player is referred to as a "user" herein.

Some embodiments described herein are associated with a "player device", "user device" or a "network device". As used herein, a "player device" is used interchangeably with "user device" and is a subset of a "network device". The "network device", for example, may generally refer to any device that can communicate via a network, while the "player device" or "user device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

A "session" comprises a period of time spanning a plurality of event instances, game instances or turns of the game, the session having a defined start and defined end. An "event instance", "game instance" or "turn" is triggered upon an initiation of, or request for (whether directly, indirectly or as inferred from a player's interaction with the game), a score based on a move of the player. For example, a turn may be triggered by a player initiating placement of elements onto a game interface or an ending of a previous turn (by said player or a different player).

Turning now to FIG. 1, illustrated therein is a block diagram of an example system 100 which may be utilized to implement at least some embodiments described herein. The system 100 may comprise a plurality of user devices 105 in communication with a user interface server 110 and/or a game production server 120 (which servers may also be in communication with one another). The plurality of user devices 105 may be operable to communicate with either or both servers 110 and 120 via a network 115. The plurality of user devices 105 may comprise different types of user devices. In accordance with some embodiments, at least one of the user interface server 110 and the game production server 120 may be operable to communicate with or access at least one database or table to facilitate play of a game as described herein. Such at least one database or table may be stored in a storage device of at least one of the servers or may be stored in a storage device of another device (e.g., a third party cloud-based server). In some embodiments a processor (e.g., one or more microprocessors, one or more microcontrollers, one or more digital signal processors) of a user device 105, a user interface server 110 and/or game production server 120 may receive instructions (e.g., from a memory or like device), and execute those instructions, thereby performing one or more processes defined by those instructions. Instructions may be embodied in, e.g., one or more computer programs and/or one or more scripts.

In accordance with some embodiments, a user device 105 may comprise a physical, electronic device that a user utilizes in order to play the game. In some embodiments such a device may be a non-dedicated device which may comprise a computing device which stores or otherwise accesses a program or a software platform (e.g., a downloaded software application) for facilitating a user's play of the game(s) described herein. In other embodiments, a user device 105 comprises a dedicated custom-made computing device built for playing the game(s) described herein (and, in some embodiments, other games). A non-exhaustive list of example user devices includes: (i) an Apple™ iPhone™, iPad™ or iPod™, (ii) a cellular or wireless smartphone (e.g., a Blackberry™ smartphone or an Andoird™ based smartphone); (iii) a tablet; (iv) a laptop; (v) a personal computer; (vi) a kiosk; (vii) Personal Digital Assistant (PDA) device; (viii) a video game console (e.g., Microsoft™ Xbox 360™, Sony™ Plasystation™, and/or Nintendo™ Wii™); (ix) a handheld or portable video game device (e.g., Nintendo™ Game Boy™ or Nintendo™ DS™); and (x) an interactive television console. A user device 105 may comprise and/or interface with various components such as input and output and, in some embodiments, a user interface server 110 and/or a game production server 120. In some embodiments, a user device may be running (i) the Google™ Android™ operating system; (ii) a Facebook™-based application for facilitating the game(s) described herein; (iii) any web browser, such as Internet Explorer™, Chrome™, Firefox™, Netscape™, Safari™, Opera™, etc.; (iv) an operating system such as Windows™, Mac™, Unix, or any version of Linux.

In accordance with some embodiments, at least one of user interface server 110 and game production server 120 may comprise a server computer operable to administer or facilitate play of a game as described herein. In accordance with some embodiments, at least one of the user interface server 110 and the game production server 120 may comprise one or more computing devices comprising one or more processors and software modules or applications for facilitating a process operating on one or more computing platforms. For example, in accordance with some embodiments, at least one of user interface server 110 and game production server 120 may comprise one or more computing devices responsible for handling online processes such as, but not limited to: (i) serving a website comprising one or more games or game interfaces to a user device and/or (ii) processing transactions (e.g., wagers, deposits into financial accounts, managing accounts, controlling games, etc.). Other examples of processes which may be performed by at least one of these servers, whether operating alone or in cooperation, include: (i) maintaining the status of the games played by and/or among the users, (ii) facilitating communications between and by the users, (iii) facilitating the implementation of software releases and updates to the various user devices, and/or (iv) storing information associated with one or more users, such as their username, password, account information, last played information, leader board status, etc.

In some embodiments, at least one of user interface server 110 and game production server 120 may comprise two or more server computers operated by or on behalf of the same entity. In some embodiments, at least some of the functionality described herein as being performed by user interface server 110 may instead (or additionally) be performed by game production server 120 and vice versa. In still other embodiments, the functionalities of the two servers 110 and 120 may be combined such that only one server or set of servers with the shared responsibilities of such functionalities may be used. In still other embodiments, at least part of the functionality described herein as being performed by either the user interface server 110 or the game production server 120 may be performed by a User Device. Thus, in some embodiments a process that is described as being performed by a server can be performed in whole or in part in a User Device or combination of such devices.

In accordance with some embodiments, at least one of the user interface server 110 and the game production server 120 may be split into multiple logical or physical components. Examples of logical components are a front tier or "web layer", a middle tier and a database. Examples of physical components are multiple physical computers each operating the software instantiating a single logical layer or multiple logical layers. For example, for each game the server may be operable to (i) set up the game; (ii) facilitate execution of a move by a player; (iii) end or determine an ending of the game and selecting or determining a winner; (iv) maintaining and/or publishing communication(s) originated within the game by or on behalf of the users. In some embodiments at least one of the user interface server 110 and the game production server 120 may be operable to perform at least one of the following functions with respect to at least one user device 105: (i) publish, update and/or maintain software used to play the game; and (ii) communicate (e.g., receive or transmit) information to the user device (e.g., chat, email, or posting). In some embodiments, at least one of the user interface server 110 and the game production server 120 may be operable to perform at least one of the following functions with respect to at least one user: (i) maintain (e.g., store, track, update or determine) user account information; (ii) maintain (e.g., store, track, update or determine) information about one or more other users associated with the subject user (e.g., acquaintances and/or game opponents); (iv) maintain (e.g., store, track, update or determine) information about the user's score(s) (e.g., highest scoring per move and/or per game and/or leader board status).

Figure 2:
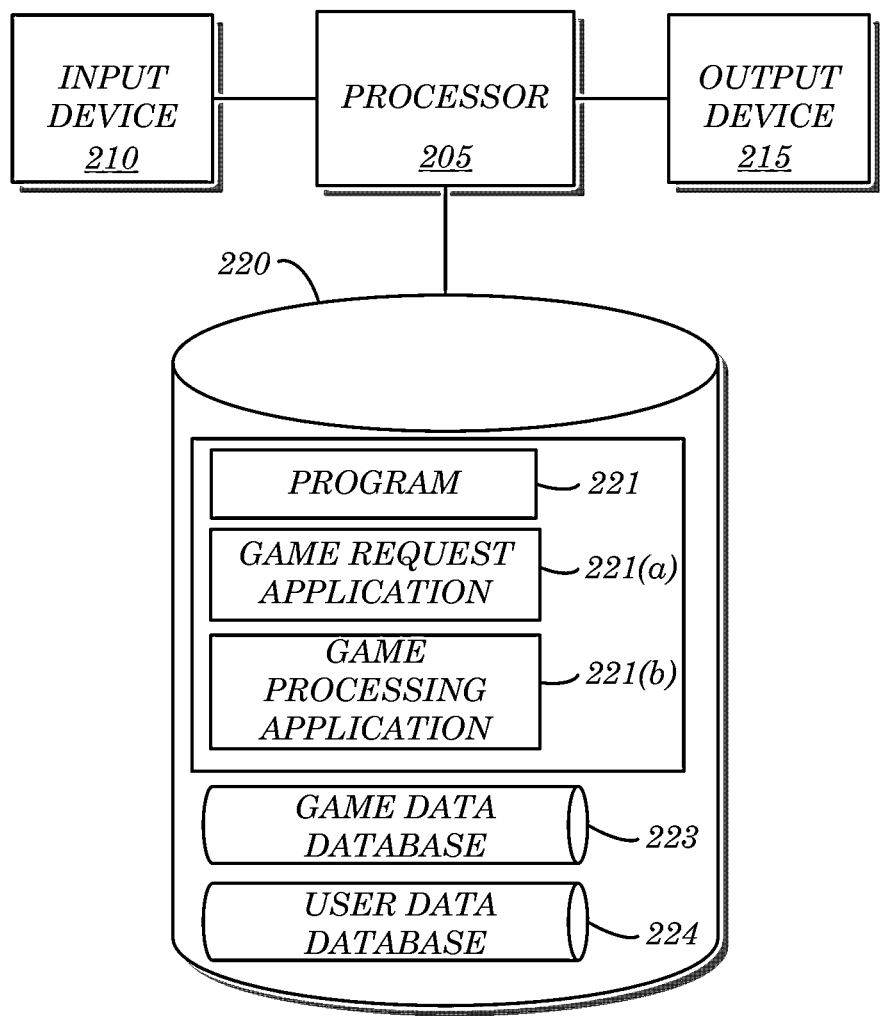
FIG. 2 comprises a block diagram of one example server for facilitating play of a game, in accordance with some embodiments.

Turning now to FIG. 2, illustrated therein is a block diagram of an example apparatus 200 which may be used to facilitate play of a game in accordance with some embodiments. The apparatus 200 may comprise, for example, at least one of a user interface server 110 and a game production server 120 (both of system 100 of FIG. 1). The apparatus 200 comprises a processor 205 operable to communicate with an output device 215, an input device 210 and a data storage device 220. Fewer or more components and/or various configurations of the components 205, 210, 215 and/or 220 may be included in the apparatus 200 without deviating from the scope of embodiments described herein.

According to some embodiments, the processor 205 may be or include any type, quantity, and/or configuration of processor that is or becomes known. The processor 205 may comprise, for example, an Intel® IXP 2800 network processor or an Intel® XEON™ Processor coupled with an Intel® E7501 chipset. In some embodiments, the processor 205 may comprise multiple inter-connected processors, microprocessors, and/or micro-engines. According to some embodiments, the processor 205 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 210 and/or the output device 215 are communicatively coupled to the processor 205 (e.g., via wired and/or wireless connections and/or pathways) and they may generally comprise any types or configurations of input and output components and/or devices that are or become known, respectively.

The input device 210 may comprise, for example, a keyboard that allows an operator of the apparatus 200 to interface with the apparatus 200 (e.g., by a player, an employee or other worker affiliated with either an online gaming company or other entity operating a system which provides games to players). In some embodiments, the input device 210 may comprise a mechanism configured to indicate to a remote server device an initiation or triggering of an event instance (e.g., that a player has initiated a move or turn of a game or requested a new game, such information being provided to the apparatus 200 and/or the processor 205). In such embodiments, the input device may comprise a key on a keyboard of the apparatus 200. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a touch-screen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 215 may, according to some embodiments, comprise a display screen and/or other practicable output component and/or device that is operable to output information. The output device 215 may, for example, comprise a display screen via which are output instructions, guidance, questions or information to a player of an online game. Examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 210 and/or the output device 215 may comprise and/or be embodied in a single device such as a touch-screen monitor.

In some embodiments, the apparatus 200 may comprise any type or configuration of communication device (not shown) that is or becomes known or practicable. For example, the apparatus 200 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., an initiation of an event instance) to a server (e.g., at least one of the user interface 110 and the game production server 120) in communication with a plurality of user devices 105. According to some embodiments, the communication device may also or alternatively be coupled to the processor 205. In some embodiments, the communication device may comprise an IR, RF, Bluetooth™, and/or Wi-Fi® network device coupled to facilitate communications between the processor 205 and another device.

The data storage device 220 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM). For example, the data storage device 220 may, according to some embodiments, store a program 221 for facilitating one or more of the embodiments described herein.

The program 221 may, for example, be operable to facilitate the general functionalities of (i) game set-up; (ii) facilitating the execution of a move or turn by a player; and (iii) determining a score and/or winner for a game. Example and thus non-limiting implementations of each of these general functionalities, which may comprise sub-modules or sub-routines of program 221, are briefly described below. For example, in some embodiments before a game begins (or upon a game beginning): (i) the game interface (e.g., game board) is set up; (ii) the elements and the rules of the particular game are selected, determined or agreed upon; and (iii) the players and the sequence with which they play are defined. This general preliminary process is one embodiment of a setup of the game. Following the setup is the playing of each move, and finally when the game ends, the winner, or the score details if this is a single-player game, is announced. Of course, in other embodiments a program 221 of apparatus 200 may comprise different or additional functionalities or submodules. For example, in a single player implementation the sequence of how players are to move is not necessary. In another embodiment, in an implementation in which only a single type of game defined by a set of rules is available, determining or selecting the rules for a particular game may not be necessary.

Turning now to an example implementation of what a setup subroutine may comprise, in accordance with one embodiment, at least one of the following parameters (and, in some embodiments, a value for each such game parameter) may be determined: (i) the number of available symbol positions on a game interface (e.g., the size of the board); (ii) the type, number and placement of available symbol positions having special scoring rules associated therewith (e.g., the multiplier squares); (iii) the type and number of elements or symbols to be used in the game (e.g., the number of game elements to be made available in a general pool or set of elements from which particular elements for each user participating in the game are selected); (iv) the number of elements each player holds for each move; (v) the one or more rules in accordance with which the move is declared valid; (vi) the one or more rules in accordance with which a score of each move and/or of the whole game is calculated; and (vii) the one or more rules for determining the winner of the game.

It should be noted that any of the foregoing factors and/or values thereof may be determined by the processor 205 in accordance with the program 221 and/or by mutual agreement among the players (in embodiments comprising a multi-player game). In one example of factor (iii) in the list above, the type and number of elements to be used in the game could be finite (e.g., a predetermined number) in some embodiments while in other embodiments there may be no such limit. In still other embodiments the number of elements in such a pool may comprise a multiple of a set of predetermined element pools, or it can refresh automatically based on certain predetermined conditions. The number of elements each player holds can similarly be fixed, or variable based on certain rules.

In accordance with some embodiments, the game elements utilized can be a combination of single-digit numbers from 0 to 9, letters, symbols, and "blank" elements which can be turned into any number or letter or symbol by the player. In some embodiments, every type of available game element is associated with a respective particular number of points ("score"). In some embodiments, the number of points or score value of a game element may also comprise the content (e.g., numeral) of the game element (e.g., a "4" element scores 4 points), which numeral is utilized to determine whether the placement of the element satisfies a rule defining valid moves in the game, such as a required mathematical relationship of the element with numerals of other associated game elements (e.g., elements within a predetermined positional relationship or elements placed or otherwise identified by the player as being for the current move). In other embodiments the content of the element used to determine whether the move is valid may be different from the point or score value of the element (e.g., a "0" can score 0 points or 10 points). If the point or score value of an element is different than the numeral of the element used to determine whether placement of the element with other elements satisfies a required mathematical relationship, then the element may include a second, potentially smaller, numeral or other symbol that indicates its point or score value. For example, the "blank" element can score 0 points, or a different number of points, or its score can vary depending on the number the player determines the "blank" element to represent. Variations can be on elements that represent numbers within a specific modulo, such as 0-9 (for modulo 10), 0-7 (for modulo 8), 0-9 plus A, B, C, D, E, F (for modulo 16), 0-9 plus A-Z plus some symbols (for modulo 64), etc. In accordance with some embodiments, the distribution of the elements and the score of each element may be decided based on certain rules, which can be as complex as a function on the elements on the players' hands and the elements already played in the board, or as simple as selecting elements completely at random before every element selection, or simply selecting at random from a fixed element distribution decided a-priori.

As described above, in some embodiments a setup subroutine of program 221 or another module or program may comprise a determination of how many elements each player is to be provided as available for placement by the player during a move (e.g., how many elements each player is to "hold" at the beginning of each move or turn). This may, in some embodiments, be a function of the player's previous moves or game history. In other embodiments, the number of elements for a player may be determined on a random or pseudo-random basis (e.g., using a random number generator algorithm) or may be a predetermined number defined by the rules of the game. For purposes of one illustrative example, it may be assumed that each player is to be provided seven (7) elements and is to have seven (7) elements available for placement at the beginning of each turn or move, such that any elements placed or used by the player during a particular move are replaced with additional elements at the end of the move or at the beginning of the next move. In this example, it may further be assumed that seven (7) elements are selected or determined on a random or pseudo-random basis and after every move where the player places N (where N is less or equal to 7) game elements on the board the process selects N new game elements (if the central pool still has N game elements available, or all the remaining game elements in the central pool if less than N are available) using the above element distribution to make available to the player for placement, such that at the beginning of every move the player has 7 game elements available for placement (e.g., until the game elements in the central pool are exhausted).

As described, in some embodiments a subroutine of program 221 or another module or program may comprise (i) determining and/or utilizing one or more rules for determining a validity of a move and/or (ii) determining and/or utilizing one or more rules for scoring a move or turn or the whole game or session of the game. Some example rules for determining the validity of a move may comprise: (i) determining whether the elements to be evaluated for a move (e.g., elements placed by the player for a move and, in some embodiments, elements previously placed on the game interface to which the player has added one or more additional elements during a current move) satisfy a requirement for the elements to be placed in sequence along a single horizontal or vertical line; (ii) determining whether any newly placed element(s) create a contiguous sequence with elements previously placed on the game interface; and (iii) determining whether at least one of the element(s) placed during a current move have been placed next to at least one element previously placed on the game interface (e.g., during a previous move, by the player of the current move or another player), unless the present move is the first move of the game. Some example rules for determining a score may comprise taking into account (i) the position of the sequence of elements being evaluated for a current move; (ii) the length of the sequence of elements being evaluated for a current move; (iii) the number of elements being evaluated for the current move; (iv) a score or point value associated with each element being evaluated for a current move; (v) the sequence(s) modified by each element being evaluated for a current move; (vi) the number of the moves already played by that player or all players in the current session or game; and (vii) whether this is the first or the last move of this player or all players in the current session or game. It should be noted that not all of the example rules for determining a score may be utilized and any combination of the foregoing or other rules may be utilized in determining a score.

It should be noted that, in accordance with some embodiments, the elements evaluated for a current move to determine a validity of the move and/or a score for the move may comprise not only elements placed by the player onto the game interface during the current move but other associated elements (e.g., elements within a predetermined positional relationship to the element(s) placed by the player in the current move or elements indicated by the player as the ones to be evaluated for the current move).

For example, as described herein, in some embodiments the player whose turn it is to play a move selects the elements to play and places them on the board in a single horizontal or vertical line. In accordance with some embodiments the sequences generated as a result of element(s) placed by the player may be required to form a contiguous line in order to form a valid sequence which may be accepted and evaluated for a score. However, in some embodiments it may be acceptable for a player to place elements to the left or to the right of elements previously placed on a game interface (e.g., in a previous move by the same or a different player), such that any elements placed by the player in the current move do not form a contiguous sequence by themselves but do form a contiguous sequence when evaluated with any intervening or connecting elements. For example, assume the following three elements have previously been placed on a game interface in a vertical line (e.g., in a vertical line of adjacent element positions of the game interface):

8
7
5

In accordance with some embodiments, a player for a current move may add the elements "2" and "9" onto the game interface in a valid move which results in a contiguous sequence of elements in a horizontal line, utilizing one of the previously placed elements already on the game interface:

8
279
  5

Thus, in some embodiments determining the validity of the current move (and determining the score for the current move), may comprise evaluating not only the element(s) placed by the player onto the game interface in the current move but also elements previously placed on the game interface, the combination of the currently placed elements and the previously placed elements forming the set of elements evaluated for purposes of the current move. In the present illustrative example, the sequence of the "2", "7" and "9" may comprise the set of elements evaluated. Thus, even though the two elements placed onto the game interface by the player in the current move (the "2" and the "9") do not by themselves form a contiguous sequence in a straight line, they do contribute to a valid sequence of elements in a contiguous and straight line and thus the move may be considered to be valid in accordance with some rules.

As also described, in some embodiments a subroutine of program 221 or another module or program may comprise one or more rules for determining whether or when the game is over (e.g., the subroutine may comprise certain conditions which, when satisfied, cause the game to end). In accordance with some embodiments, determining an end of the game may be a function of at least one of (i) the scores of the player(s) participating in the game; (ii) the number of moves of one or more of the player(s); (iii) the number of elements remaining as available for output to player(s) in a pool or set of elements; (iv) the number of elements remaining as available for use by one or more of the player(s) participating in the game; (v) the number and/or type of elements placed in total or by one or more of the player(s). In accordance with some embodiments, a game or session is determined to end or is ended upon a player placing all of their available elements on the game interface. In some embodiments, a game or session is determined to end when there are no more available elements to select from a pool or set of elements, for distribution to a player. In still other embodiments, a game or session is determined to end when none of the players can place another element on the board (e.g., none of the elements available to a player may be placed in any manner which would satisfy a required mathematical relationship with other elements for a valid move).

In accordance with some embodiments and as described herein, a subroutine of program 221 or another module or program may comprise determining and/or utilizing one or more rules for determining a winner of the game. Such a subroutine may be particularly applicable in games which involve multiple players. In accordance with some embodiments, determining a winner of a game may be based on at least one of the following factors: (i) the highest-scoring move, (ii) the total final score for each player, (ii) the creation of the longest sequence in the board. In some embodiments, the winner is simply determined to be the player who has achieved the highest score during the game.

It should be noted that in some embodiments, some of the determinations described above (e.g., composition of the game interface (e.g., size of the board), number and placement of element positions associated with special scoring rules (e.g., multiplier squares), rule(s) for determining a validity of a move, rule(s) for determining a score for a move or game, an end of a game), may be predetermined and programmed into the software or application module for facilitating the game and need not be determined anew for each game initiated by a player. Thus, for example, executing a determination or decision as described herein may comprise retrieving one or more rules pertaining to the game from a database or other memory or executing a subroutine of a game program. In some embodiments, a game may allow for customization of one or more default configurations or rules which are implemented unless a player indicates otherwise.

It should be noted that although the term "sequence" is used herein to refer to an arrangement of elements, other arrangements of elements would also be within the scope of the embodiments described herein and the term "sequence" is used merely for convenience. For example, in some embodiments a player may be allowed to skip or leave a position blank when arranging elements on a board and yet still have the elements near the open position qualify for a given move or score. It should further be noted that although "multiplier" positions are described as examples of positions which may cause a benefit or bonus to be applied to a player's score, other bonus schemes are also within the scope of the embodiments described herein. For example, in some embodiments, a certain position may cause a predetermined number of extra bonus points to be awarded to a player who places a qualifying element on that position, rather than multiplying a number of points that would otherwise be awarded.

The game request application 221(a) may comprise, for example, a subroutine, program or software module operable to respond to requests for games from players. In some embodiments, the game request application 221(a) is a subroutine or module of program 221. For example, in one embodiment the game request application 221(a) may comprise code or instructions operable to facilitate or perform the initiation of a new game (e.g., such as the game setup functionality described herein (e.g., with respect to program 221)). In one embodiment, the game request application 221(a) is launched or initiated upon a request for a new game from a player and comprises the game setup functionalities of determining at least one of (i) the number of available symbol positions on a game interface (e.g., the size of the board); (ii) the type, number and placement of available symbol positions having special scoring rules associated therewith (e.g., the multiplier squares); (iii) the type and number of elements or symbols to be used in the game (e.g., the number of game elements to be made available in a general pool or set of elements from which particular elements for each user participating in the game are selected; (iv) the number of elements each player holds for each move; (v) the one or more rules in accordance with which the move is declared valid; (vi) the one or more rules in accordance with which a score of each move and/or of the whole game is calculated; and (vii) the one or more rules for determining the winner of the game.

In accordance with some embodiments, the game processing application 221(b) may comprise, for example, a subroutine, program or software module operable to facilitate play of a game by a player after it has been initiated. In some embodiments, the game processing application 221(b) is a subroutine or module of program 221. For example, in one embodiment the game processing application 221(b) may comprise code or instructions operable to facilitate or perform the functionalities of (i) evaluating a set of elements for a current move to determine whether it is valid; (ii) determining which element(s) to evaluate for a current move; (iii) determining a score for a current move; (iv) determining whether a game is over; and/or (v) determining a winner of a game.

In accordance with some embodiments the data storage device 220 may further store one or more tables or databases, such as (i) a game data database 223; and (iii) a user data database 224. Of course, different or additional databases may also be stored and neither of these databases is required for all embodiments.

The game data database 223 may store, for example, data defining a particular game. Examples of such data include, without limitation: (i) a history of moves in the game; (ii) an indication of which player is to make the next move; (iii) an indication of elements available for distribution to player(s) participating in the game (e.g., elements available in a pool or set of elements available for distribution to players); (iv) an indication of score(s) achieved or determined during the game; (v) an indication of elements distributed to player(s) and thus available for placement on the game interface; (vi) an indication of elements placed on the game interface and the position of each such placed element; and (vii) a composition of a game interface for the game (e.g., number and configuration of element positions and any special scoring rules associated with any such element positions). In some embodiments, a game may be playable over a relatively long period of time, with periods of inactivity between moves. In such embodiments, the data stored for a game may persist at least until the game is determined to have ended. In some embodiments, a unique identifier may be determined or generated for each game as it is initiated and also stored in the game data database 223 in association with the data defining the game. In some embodiments, an identifier uniquely identifying each user participating in the game may also be stored.

The user data database 224 may store data defining one or more users participating in (or who have participated in) one or more games facilitated by the apparatus 200 or who have registered with an entity associated with the apparatus 200. For example, for each user on which data is stored in the user data database 224, at least one of the following may be stored: (i) a unique identifier of a user (e.g., an identifier generated or determined by the apparatus 200 to internally uniquely identify a user); (ii) an indication of past game(s) or score(s) of the user; (iii) contact information for the user (e.g., an e-mail address, mobile telephone number, IP address of an associated user device, etc.); (iv) login credentials for accessing a website or application via which game(s) described herein may be played (e.g., user name and password); and (v) a current status of the user (e.g., whether the user is currently engaged in an active game, online, logged in, an active user, a user of a certain player rating, etc.). An example table of a user data database 224 is provided below:

| User_id | Int |
|---|---|
| Username | Char(40) |
| Password | Char(40) |
| Failed_login_attempts | Int |
| Last_login | Time |
| Is_online | boolean |

Either or both of the game data database 223 and the user data database 224 (or any other databases described herein) may comprise one or more databases and/or tables which may be stored in a storage device distinct from the data storage device 220 or in an apparatus distinct from apparatus 200. It should be noted that any or all of the exemplary instructions and data types described herein and other practicable types of data may be stored in any number, type, and/or configuration of memory devices that is or becomes known. The data storage device 220 may, for example, comprise one or more data tables or files, databases, table spaces, registers, and/or other storage structures. In some embodiments, multiple databases and/or storage structures (and/or multiple data storage devices 220) may be utilized to store information useful in various embodiments described herein. According to some embodiments, the data storage device 220 may be incorporated into and/or otherwise coupled to the apparatus 200 (e.g., as shown in FIG. 2) while in other embodiments it may simply be accessible to the apparatus 200 (e.g., externally located and/or situated).

It should be noted that the apparatus 200 may function as a computer terminal and/or server of an online game provider or other entity operating to provide online games, receive and/or manage information related to online games. In some embodiments, the apparatus 200 may comprise a web server and/or other server device operable to facilitate an online game. In some embodiments, the apparatus 200 may comprise an apparatus that is operable to interact with a player of an online game. In some embodiments, apparatus 200 may comprise a plurality of devices working together to accomplish the functionality described herein with respect to FIG. 2. In some embodiments, the apparatus 200 may comprise an apparatus operable to communicate with a server of another entity (e.g., a social network server such as a Facebook™ server) for facilitating the provision of online games to users of the other entity.

In accordance with some embodiments, the apparatus 200 may comprise (i) a front tier server accepting the requests for the game play and communicating the information back to user devices 105; (ii) a front tier server; and (iii) a middle tier logical component of the server, handling the user device-to-server communication and performing the logic of the game.

Figure 3A:
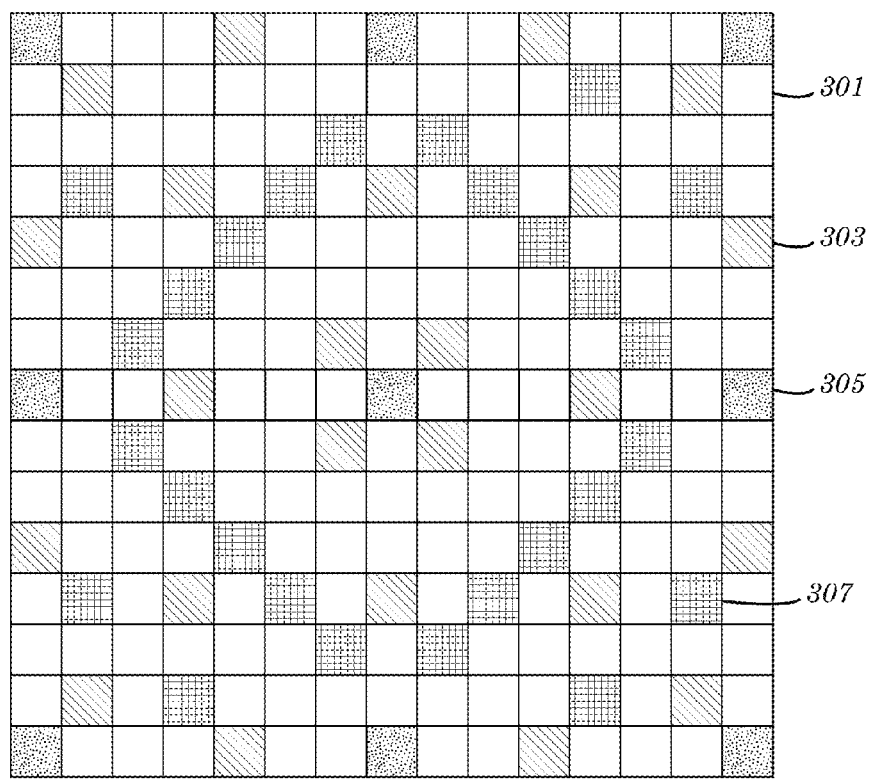
FIG. 3A comprises an example illustration of a game interface comprising a plurality of element positions available for placement of game elements, in accordance with some embodiments.
Figure 3B:
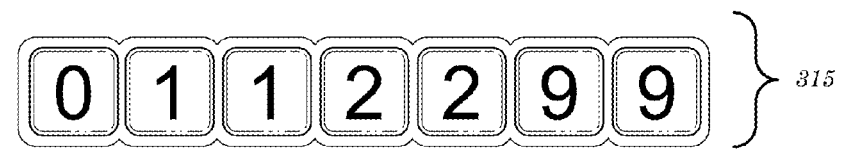
FIG. 3B comprises the example illustration of the game interface of FIG. 3A after a player has placed some game elements on some element positions of the game interface, in accordance with some embodiments.
Figure 3B:
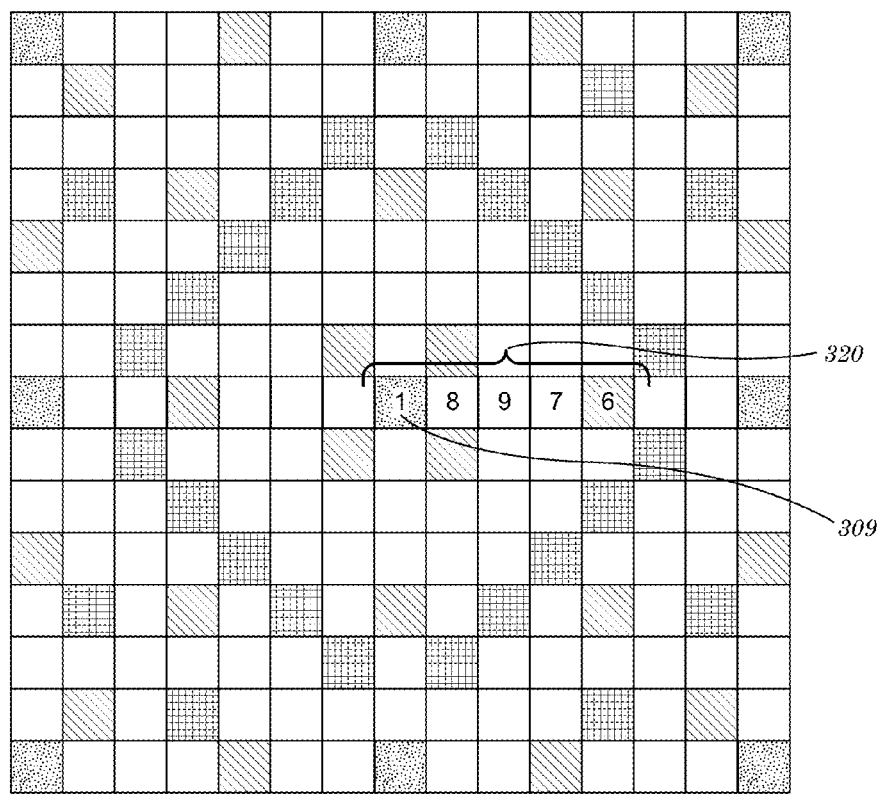
Figure 3C:
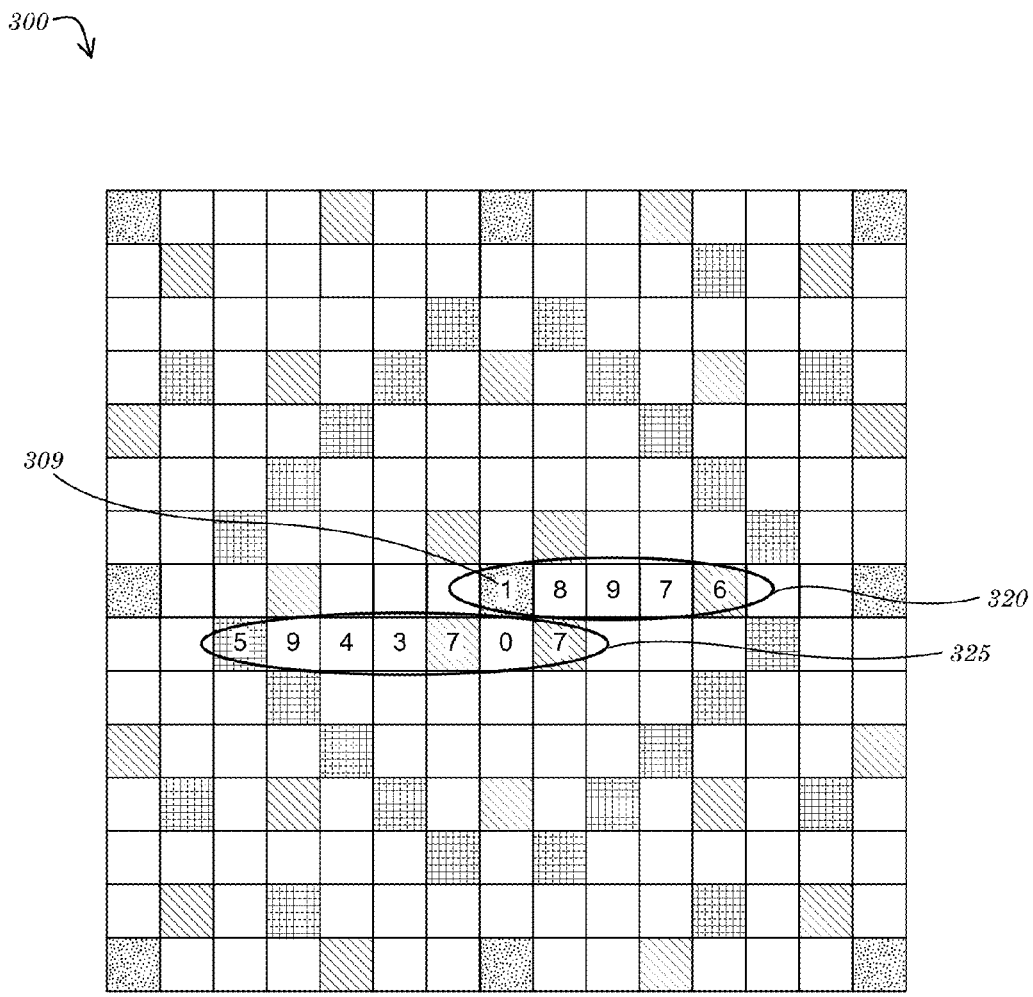
FIG. 3C comprises the example illustration of the game interface of FIG. 3B after a player has placed some additional game elements on some additional element positions of the game interface, in accordance with some embodiments.

Turning now to FIGS. 3A through 3C, illustrated therein are snapshots of an example game interface 300 and, with respect to FIGS. 3B and 3C, the game elements placed thereon as play of a game progresses. In particular, FIG. 3A illustrates an example game interface as it may appear at the beginning of a game prior to any game elements being placed thereon. The game interface 300 comprises, in accordance with some embodiments, a plurality of available element positions arranged in a 15×15 square grid or tile pattern. As described herein, a game interface may comprise different types of element positions. In some embodiments, each different type of element position may be indicated in a visually differentiable manner. In the particular embodiment of FIGS. 3A through 3C, different types of element positions are depicted as either (i) white/no background pattern (type 301); (ii) a diagonal striped background pattern (303); (iii) a dotted background pattern (305); and (iv) a grid background pattern (307). Of course, any other manner of indicating to a player different types of element position may be used and the embodiments described herein are not dependent on any particular manner of depicting such differences. The different types of element positions may, in some embodiments, each be associated with a respective scoring rule. For example, a white/no background patter type 301 may be associated with a scoring rule in accordance with which an element placed on such positions is counted simply as the face value point or value score indicated on the element or associated with the element. In another example, a diagonal striped background pattern 303 may be associated with a scoring rule in accordance with which a face value point or value score on an element placed on such position is doubled (or has some other benefit applied to it).

In accordance with some embodiments, one or more of the available symbol positions (e.g., squares) on a game interface may be marked to indicate that placement of elements on these positions qualifies the associated player for bonus points or higher scores or is otherwise associated with a special scoring rule (e.g., the positions may be marked with notations such as "2E", "2*", "3E", "3*", "2S", "2X" and "3S", "3X", or similarly, and may be color coded or otherwise visually differentiated to indicate that status). For example, in accordance with some embodiments "2E" or "2*" means "double element", namely the score of the element placed in that position is counted twice. Similarly, "3E" and "3*" may mean "triple element". "2S" and "2X" may mean "double sequence", i.e., that the whole sequence of elements which includes the element in that position is counted twice. And similarly "3S" and "3X" may mean "triple sequence". Variations can include, for example, "4E", "4*", "4S", "4X" or higher multipliers, or multipliers that get triggered only when a sequence of elements that is adjacent to or otherwise within some predetermined relationship to the multiplier position is modified, or multipliers that are triggered both when a sequence of elements which includes the element on the multiplier position is created as well as when the sequence is modified (e.g., additional elements are added to the subject sequence, either by the same player or a different player). In the example interface 300 of FIGS. 3A through 3C, the dotted background pattern element position type 305 comprises one associated with a "3X sequence multiplier" scoring rule, the grid background element position type 307 comprises one associated with a "2X sequence multiplier" scoring rule, and the diagonal line background element position type 303 is associated with a "2X game element multiplier" scoring rule. For example, a "3X game element multiplier" scoring rule may be used or a "add 3 points to game element point value" scoring rule may be utilized. Many other scoring rules which provide some benefit to a player as a result of the player placing a game element on an element position associated with the scoring rule would be appreciated by one of ordinary skill in the art upon reading the present disclosure.

It may be assumed, for purposes of illustrating one non-limiting example of a game which may utilize a game interface such as game interface 300, that the game elements available for placement during a game may be "blank" elements or elements which have indicated thereon a numeral from the set "0", "1", "2", "3", "4", "5", "6", "7", "8" and "9." In accordance with some embodiments, the distribution and scoring of the game elements is selected a-priori. It may further be assumed that the particular distribution of game elements in the example game (i.e., the set of elements from which elements are selected and output to player(s) as available for placement on the game interface during a move) consists of two (2) blank game elements, ten (10) "0" elements, fourteen (14) "1" elements, fourteen (14) "2" elements, fourteen (14) "3" elements, eight (8) "4" elements, eight (8) "5" elements, eight (8) "6" elements, six (6) "7" elements, six (6) "8" elements, and six (6) "9" elements, as summarized in the table below (a face value score or point value also being shown for each type of element):

| Game element | Number of element in available set | Score Value of element |
|---|---|---|
| "blank" | 2 | 0 |
| 0 | 10 | 0 |
| 1 | 14 | 1 |
| 2 | 14 | 2 |
| 3 | 14 | 3 |
| 4 | 8 | 4 |
| 5 | 8 | 5 |
| 6 | 8 | 6 |
| 7 | 6 | 7 |
| 8 | 6 | 8 |
| 9 | 6 | 9 |

In this particular example, each game element's score value (i.e., the number of points or value of a score contributed to a total score for a move involving the element) is the same as the number indicated on the game element and utilized for purposes of determining whether the game element satisfies a required mathematical relationship with the other game elements being evaluated for a current move; and the score value of a "blank" element is 0.

Referring now to FIG. 3B, illustrated therein is the game interface 300 with the additional game interface area 315, for showing a set of game elements provided to a player for use in placing onto the game interface during a move. In accordance with some embodiments, it may be assumed that for purposes of the present example each player can hold seven (7) game elements, which the central process selects at random from the central pool of game elements and adds to the game elements of each player after each move so that, if there are enough game elements available in the central pool, each player always ends up holding seven (7) game elements. The example area 315 shows the seven (7) numbers the player has available as: "0", "1", "1", "2", "2", "9" and "9".

The illustration of game interface 300 of FIG. 3B further shows that, in the present example scenario, at least one player has placed a sequence of numbers 320 onto the game interface. The sequence 320 placed by the at least one player is "1-8-9-7-6." As can be seen, the "1" in the sequence has been placed on the center symbol position 309. After a player has placed the sequence 320 on the game interface 300, a processor (e.g., a processor of apparatus 200 or a processor of a user device (if different from apparatus 200)) may evaluate the validity of the sequence 320 and/or calculate a score for the sequence 320.

As described herein, evaluating a sequence to determine whether it is valid may, in some embodiments, comprise determining whether the game elements of the sequence satisfy a mathematical relationship or other rule. In some embodiments, the required mathematical relationship that all elements of a sequence must bear to one another is a (modulo 10) addition or a (modulo 10) difference. (Modulo 10) is also alternatively referred to in the mathematical literature and herein as (mod 10). It should be noted that in accordance with some embodiments the mathematical term (modulo 10) addition simply means: add the numbers and just use the last digit. So 7+9=16, therefore 7+9 (modulo 10)=6. Similarly, two numbers differing by (modulo 10) really means that if you lay down the numbers in sequence: 0, 1, 2, 3, 4, 5, 6, 7, 8, 9, then a number is next to another in this sequence, and the sequence wraps around like a circle, so that 0 is actually next to 9. Assuming for purposes of the present non-limiting example that any sequence placed on a game interface must satisfy the mathematical relationship of a (mod 10), a processor would determine the sequence 320 to be a valid one since 1+8=9 (mod 10), 8+9=7 (mod 10) and 9+7=6 (mod 10).

In accordance with some embodiments, calculating a score for a sequence or other set of numerals being evaluated may comprise adding up the score value of each game element of the sequence (which respective score value, in accordance with some embodiments, is also the value used for determining whether the game elements satisfy the required mathematical relationship in order to determine whether the sequence is a valid one). In accordance with some embodiments, the calculation of a score may further take into account any special scoring rules associated with any element positions onto which a numeral of the sequence has been placed. For purposes of the present example, the "1" has been placed on a dotted background pattern element position type 305 while the "6" has been placed on a diagonal line background element position type 303. As described with respect to FIG. 3A, the dotted background pattern element position type 305 comprises one associated with a "3X sequence multiplier" scoring rule and the diagonal line background element position type 303 is associated with a "2X game element multiplier" scoring rule. Thus, using these scoring rules and the face value of the points associated with each game element of the sequence, a processor may calculate the score for the sequence 320 as follows: (1+8+9+7+(2×6))×3=(1+8+9+7+12)×3=37×3=111. The processor may further provide to the player replacement game elements to replace the five game elements used by the player to create the sequence 320.

Turning now to FIG. 3C, illustrated therein is a representation of game interface 300 at a time after the placement of the sequence 320 of FIG. 3B, after a player (either the same player who placed the sequence 320 of FIG. 3B or another player, the latter if the game being played is a multi-player game). Assuming the player was provided with the elements "0", "3", "4", "5", "7", "7", "9", it can be seen in FIG. 3C that the player elected to place these numbers onto the game interface 300 as the sequence 5-9-4-3-7-0-7 (sequence 325). As with sequence 320 of FIG. 3B, the sequence 325 may be evaluated by a processor (e.g., a processor of apparatus 200 or a processor of a user device (if different from the apparatus 200)) to determine whether it is valid and/or a score may be calculated for the sequence.

For purposes of the present example, it may be assumed that a processor would determine the sequence 325 to be valid because it satisfies the (mod 10) addition mathematical relationship requirement applied to sequence 320 of FIG. 10 and because, in accordance with some embodiments, it further satisfies an additional rule of the game in that at least one of the game elements of a placed sequence must be adjacent to game element of a previously placed sequence (in the example of FIG. 3C, there are two adjacent game elements since the "0" of sequence 325 is under the "1" of sequence 320 and the second "7" of sequence 325 is under the "8" of sequence 320). The sequence 325 satisfies the (mod 10) addition mathematical relationship as illustrated: (i) 5+9=4 (modulo 10), (ii) 9+4=3 (modulo 10), (iii) 4+3=7 (modulo 10), (iv) 3+7=0 (modulo 10), and (v) 7+0=7 (modulo 10).

It should further be noted that the placement of sequence 325 actually created three (3) distinct sequences, in that the "1" of sequence 320 and the "0" of sequence 325 created a second sequence and the "8" of sequence 320 and the "7" of sequence 325 created a third sequence. It should be assumed for purposes of the present example that the (mod 10) addition mathematical relationship requirement is applied to sequences of three (3) or more elements while a two (2) element sequence must satisfy a distinct rule that the numbers of the two game elements differ by (mod 10). Applying this latter mathematical relationship requirement to the two other 2-element sequences created by the placement of sequence 325, it may be seen that each of the sequences would be determined to satisfy this rule: the sequence "1-0" is valid because it is a two number sequence and the numbers differ by (mod 10) and the sequence "8-7" is valid because it is a two number sequence and the numbers differ by (mod 10).

In accordance with some embodiments, computing a score for a move may comprise summing the score for each sequence created during the move by (i) summing, for each given sequence of the move, the face value point score of each game element; and (ii) applying any special scoring rules of any element position(s) onto which an element of a given sequence has been placed, provided those element positions have not been used by an existing sequence in the board. Recalling from the description of FIG. 3A that (i) the diagonal line background element position type 303 is associated with a "2X game element multiplier" scoring rule; and (ii) the grid background element position type 307 comprises one associated with a "2X sequence multiplier" scoring rule, a processor computing a score for the move illustrated in FIG. 3C (and the three sequences resulting from that move, including the sequence 325 and the "1-0" and "8-7" sequences) would compute the score as follows:

1+0=1  a)

8+(2×7)=22  b)

[5+9+4+3+(2×7)+0+(2×7)]×2=98  c)

In accordance with some embodiments, bonus points may be added to a score if certain conditions are satisfied. For example, in some embodiments, bonus points may be added to a score for a move if all of the game elements available to the player for placement during the move are in fact placed by the player during the move. In the present example, it may be assumed that 100 bonus points are added to the score for placing all seven (7) of the available game elements onto the game interface 300 during a move. Thus, in such embodiments the score of 98 may be finally determined to be 198 for the move.

Figure 4:
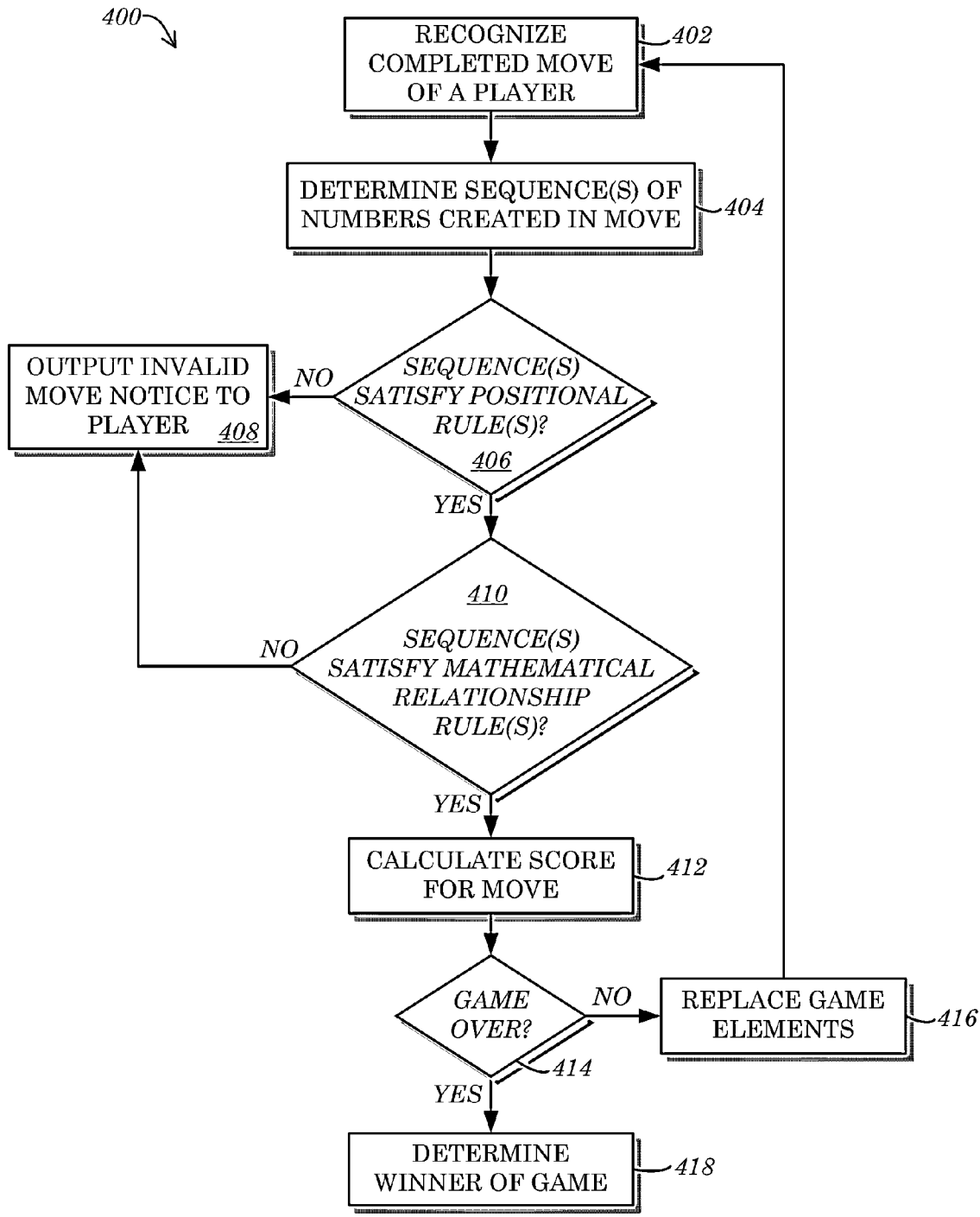
FIG. 4 comprises a flow diagram of one example process for facilitating a game, in accordance with some embodiments.

Turning now to FIG. 4, illustrated therein is a flowchart of an example process 400 which is consistent with some embodiments described herein. The process 400 may be performed, for example, by a processor of an apparatus 200 and/or a processor of a user device (if different from apparatus 200). Of course, additional or different steps from those illustrated may be used and not all of the steps described with respect to process 400 are necessary or preferred in all embodiments. The process 400 may, in some embodiments, begin upon it being determined that a user has initiated a game, requested a new game to be initiated or requested to enter, join or return to a game in progress. For example, depending on the embodiment, a user may initiate, join, re-join or return to a game by various methods, including but not limited to, initiating a single-player game; initiating a multi-player game with a randomly chosen user or an existing acquaintance of theirs or a computer opponent; or accepting another user's or computer opponent's invitation to play a game. In some embodiments, a player may initiate or join a game, make one or more moves in the game, pause the game, unjoin the game or not participate in the game for some time, and subsequently rejoin or return to the game. In such embodiments, if the game is a single player game, the game may be paused (e.g., for a maximum period of time or for an indefinite period of time) until the player returns to the game. If the game is a multi-player game, the one or more other players may, in some embodiments, be allowed to continue the game without the player while in other embodiments the game is paused until the player makes his/her next move (e.g., the game progresses while the other player(s) move, then is paused when it is the subject player's turn to move).

It should be noted that in some embodiments a given user can be involved with (e.g., playing or participating in) multiple games at a given time (e.g., playing them in parallel). In such embodiments the user may be playing the multiple games on the same user device or different user devices, the games can be of the same type or they can be of different types (e.g., at least one of which may be a single player game while another is a multi-player game, where the multi-player games can be played with multiple opponents or with the same opponent). For example, in some embodiments upon launching a software application for facilitating the game on the appropriate user device 105 and/or logging into a website or server operable to facilitate the game (e.g., logging into a website of user interface server 110 or game production server 120) via a user device 105, a user may (i) be prompted to place a move in the one or more games the user has previously initiated or joined; (ii) be provided with an interface for initiating a new game or joining a game in progress or previously initiated by another player.

For example, in one embodiment involving a multi-player game and upon entering a game or game provider website, the user is provided with information and/or gets notified regarding the move(s) of the other player(s) if they are playing a multi-player game, and is prompted to play a move when it is the subject player's turn to make a move (e.g., place a sequence). In another embodiment involving a multi-player game, a user who has previously initiated or joined a multi-player game that has not yet ended may receive a notification, via one or more of their user devices associated with the player, (i) when it is the player's turn to play; (ii) when one of the other players has won the game, quit the game, lost the game, or made some other game-related action, or (iii) when another user sends them a message via email or chat or via posting into another platform.

It should be noted that in some embodiments, players participating in a multi-player game may be provided with a means of communication with one another. For example, upon entering a game, when sending a move, when finishing or winning or quitting the game and at any other time a player may be allowed to choose to communicate their actions, such as playing of the game, their last move, their score, etc, (e.g., with automatically generated and/or custom comments) via chat or email or posting to sites such as the website of the game provider, Twitter™, Facebook™ or others.

Returning now to process 400, in step 402 it is determined that a player participating in a game has completed a move in the game (e.g., the player has finished placing game elements on the game interface 300). In accordance with some embodiments, step 402 may be triggered by an indication from a player while in other embodiments step 402 may comprise an automatic determination by a processor (e.g., based on information inferred from a player's action or a time allotted for a move). For example, in some embodiments a player may actuate a "done" or "move complete" button or area of the game interface to indicate that the game elements for the move should be evaluated.

In step 404 the one or more sequence(s) of numbers created in the move is/are determined. For example, at least one sequence created by a player in a current move via placement of one or more game elements on the game interface is determined. In some embodiments, step 404 may comprise identifying the at least one game element to be evaluated for a current move. In some embodiments, such a determination may be done automatically by a processor (e.g., based on game elements placed by the player during the current move). For example, the one or more game elements placed by a player may be identified and a positional relationship evaluation of the one or more game elements placed by the player may be performed to identify any sequences created by the player which may also include one or more game elements previously placed on the game interface (by the player performing the current move or another player). In other embodiments, a player may manually indicate which game elements are to be evaluated for a current move (e.g., by "clicking" on or otherwise selecting game elements for evaluation).

In step 406, the one or more sequence(s) determined in step 404 are evaluated to determine whether they satisfy one or more positional rule(s) for the game. In some embodiments, such an evaluation is performed separately for each sequence created by a move (if more than one sequence has been created, which in some embodiments is only possible after the first move of the game, when placement of game elements onto the game interface may create one or more sequences with game elements previously placed on the game interface in addition to any sequences created by the newly placed elements on the game interface). As described herein, in accordance with some embodiments, each move (or each sequence created by a move) needs to satisfy at least one positional relationship rule and at least one mathematical relationship rule.

A positional relationship rule defines requirements or restrictions as to how a game element may acceptably be placed on the game interface (e.g., the positional relationship as to the other game elements also placed during the current move, the positional relationship as to any game elements previously placed, and/or the positional relationship to element positions of the game interface). Various positional relationship rules have been described herein and will not be repeated for purposes of brevity. For example, it may be determined that the game elements of a given sequence are positioned along a straight horizontal or vertical line. It should further be noted that certain positional relationship rules may apply to only certain circumstances. For example, in some embodiments only the very first move of the game has the positional relationship requirement that one of the game elements placed is on the center element position of the game interface and it is only after the very first move has the positional relationship requirement that at least one placed game element is adjacent to a previously placed game element. In another embodiment, players of a certain player rating or otherwise having a certain characteristic (e.g., "expert" rated players) may have more stringent or difficult to satisfy positional relationship rules applied to their moves. In yet another embodiment, games of a certain rating or otherwise having a certain characteristic (e.g., "expert" or "difficult" games) may have more stringent or difficult to satisfy positional relationship rules applied to moves of the games. Thus, in some embodiments step 404 may comprise determining which positional relationship rule to apply (e.g., based on which move it is, a rating or characteristic of the player, a rating or other characteristic of the game, or another factor).

As described herein, in one embodiment a rule for the very first move in a game may comprise a requirement that one game element placed during the move is placed in the center square of the board. Examples of additional rules for evaluating a validity of a move include, without limitation, (i) a requirement that the elements evaluated for a given move (e.g., any newly placed game elements and any game elements already on the game interface, which are being evaluated in combination for a given move) are positioned in a sequence of game elements in a single horizontal or vertical line; (ii) a requirement that the elements evaluated for a given move be positioned such that they create a contiguous sequence; and (iii) a requirement that at least one game element placed on a the game interface for a current move is placed next to a game element previously placed on the game interface (which requirement may be omitted for the very first move of a game when no game elements have previously been placed on the game interface). Such rules may be referred to as "positional relationship" rules, meaning they are rules requiring elements being evaluated for a current move to satisfy at least one positional relationship to one another, to at least one game element previously placed on the game interface or to at least one element position of the game interface.

If it is determined in step 406 that the one or more positional rule(s) are satisfied, the process 400 continues to step 410. Otherwise, the process 400 continues to step 408, in which step a notice, message or other indication is output to the player, indicating the error or problem with the move (e.g., an explanation of why or how the game element(s) placed by the player fail to satisfy the one or more positional rule(s)). In other embodiments, a player's attempted placement of one or more game elements onto a game interface which fails to satisfy the one or more positional rule(s) may be rejected at the time it is attempted (e.g., an evaluation of the game element(s) the player is placing is evaluated at the time of the placement, before the player completes the move) and a notification may be output at that time.

In step 410 it is determined whether the sequence(s) determined in step 404 satisfy one or more mathematical relationship requirements or rules of the game. Such an evaluation may be performed separately for each such sequence. A mathematical relationship rule may, as described herein, define a mathematical relationship game elements (or the content of game elements) must bear to each other, or a mathematical function the game elements must satisfy, in order to be acceptable.

For example, in one embodiment, a set of game elements being evaluated for a current move (whether a new sequence created solely by the newly placed game elements or an old sequence modified by an adjacently placed new game element) may be evaluated to determine whether the set of game elements satisfies the following two requirements: (i) if the sequence is more than three (3) game elements long, then each game element is the sum (modulo 10) of the previous two game elements, i.e., 9 and 7 must be followed by a 6, as 9+7 (modulo 10)=6 (a "previous" game element may comprise the element to the left, if the sequence is horizontal, or directly above, if the sequence is vertical, of the subject game element); and (ii) if the sequence is comprised of two (2) game elements, then the numbers must differ by 1 (modulo 10) (e.g., such that "8" can be next to a "7" or a "9", "0" can be next to a "1" or a "9", etc.). In accordance with some embodiments, a "blank" game element can be used to represent any number (although in some embodiments the score value of the "blank" element may be zero (0) irrespective of the number it is representing in any given move). Additionally, in some embodiments once a "blank" element is selected to represent a particular number, the particular number represented by that "blank" element cannot be changed for the remainder of the game. Of course, many other mathematical relationship requirements may be utilized and the embodiments described herein are not dependent on any particular mathematical relationship requirement(s).

If it is determined, in step 410, that the one or more mathematical relationship rule(s) are satisfied, the process 400 continues to step 412. Otherwise, the process continues to step 408.

In step 412 a score is calculated for the move. For example, a score for each sequence identified in step 404 may be determined and the scores may be summed to obtain a total score for the move. As described herein, in some embodiments calculating a score may comprise applying one or more special scoring rules if a corresponding scoring condition is satisfied (e.g., a predetermined number of bonus points may be added if a player utilizes all of his available game elements in a single move). In one embodiment, step 412 further comprises adding the score for the move to the player's total score for the game.

In one example embodiment of calculating a score for a move, the processor first counts the score of each game element, such as 8 points for placing an "8"; then multiplies this by the multiplier factor if it is placed on a game element position associated with a special scoring rule (e.g., a multiplier rule such as "2E" or "3E", described above), repeating the above for all game elements placed; then counts again in the same manner the score for all sequences modified by the placed game elements but without using the multiplier squares for any game elements that were already on the game interface before the current move; then multiplies the score of each new or modified sequence by the sequence multiplier squares such as "2S" or "3S" onto which the newly placed game elements were placed; then adds a bonus of 100 for placing all seven (7) of one's game elements in a single move; then, if the player places all their game elements (which could be less than 7 game elements if there were not enough game elements to replenish his or her used game elements from a previous move) and there are no more game elements to select from the central pool of game elements, adds the score of the other player's game elements into the score of the finishing player, and subtracts the score of these game elements from the other player; and finally it tallies all of the above points to compute the score for the move.

In step 414 it is determined whether a game is over. A game may be determined to be over, for example, if at least one of the following possible conditions are satisfied: (i) one or more players participating in the game requests for it to be over; (ii) a central pool of elements for the game is depleted (e.g., all elements originally available in the pool at the initiation of the game have been output to players); (iii) a predetermined number of moves has been made; (iv) a predetermined duration of time has passed; (v) at least one player does not have any elements available that would satisfy the one or more mathematical relationship rule(s) of the game; (vi) less than a minimum number of element positions remain open for element placement (or the element positions which remain open would fail to satisfy the one or more positional rule(s) of the game if game elements were placed thereon); (vii) a player has placed all of their available game elements onto the game interface in a single move (in a manner which satisfies any positional and mathematical relationship rules of the game); (viii) each of the players has had their turn without being able to place any game elements on the game interface; or (ix) the players have had 3 consecutive tries, collectively among them, to place a move and they have failed.

In one example embodiment, if it is determined in step 414 that the game is over based on one or more predetermined conditions, the total score of the game for one or more of the players may be updated or recalculated. For example, if a player places all of their available game elements in a single move, then the processor may sum up the scores of the unplaced game elements of the other player and add the total to the score of the player who placed all of his game elements onto the game interface while subtracting the total from the score of the player(s) who did not.

If it is determined in step 414 that the game is over, the process continues to step 418. Otherwise, the process continues to step 416. In step 416, any game elements placed on the game interface by the player are replaced (e.g., the same number of game elements as the player placed on the game interface are selected at random from a pool of available game elements for the game and output to the player). The replacement game elements may be output to the player via a designated area of the game interface (e.g., such as area 315 of FIG. 3B).

Determining a winner of the game in step 418 is particularly applicable to multi-player games. In single player games there may be no need to determine a winner but one or more benefits to be provided to the player based on his score may instead be determined. The processor declares the winner as the player with the highest score after the game ends. Of course, determining the winner in step 418 may comprise determining whether any of the players participating in the game qualify for any further bonus points to be added to their total score for the game, prior to determining the winner. For example, bonus points may be added to a player's score for particularly long sequences, the greatest number of sequences consisting of a number of game elements greater than a predetermined number of game elements or for rewarding other desirable behavior.

Additional Embodiments

In accordance with some embodiments, a coach feature may be made available to players of a game, which feature provides advice, instructions or tips to the player for playing the game. In some embodiments, a coach feature may comprise facilitating a live or recorded person to provide such advice, instructions or tips. In other embodiments, a coach feature may comprise software, such as an algorithm or process operating on one or more computing platforms. Such advice, tips or instructions may be provided to a player before or after the player playing the game performs a move. Whether it be embodied as a person or software, such a coach feature is referred to as a "coach" herein for purposes of brevity.

In accordance with some embodiments, the coach takes into account the user's game elements, the moves already performed, the number and distribution of the remaining game elements and other information, and computes a move that tries to maximize the user's tactical position (e.g., a high score in this particular move) and/or the user's strategic position (e.g., by making it difficult for the other player(s) in the game to place game elements with high scores in the next move) while allowing the user enough flexibility to create high-scoring moves in the future, as well as leaving the user with good game elements to maximize their future scoring.

In one embodiment, the coach may simply propose a suggested move (e.g., a sequence of game element(s) to place and the element position(s) onto which to place them) to the user or indicate to the user what move s/he should have placed. In some embodiments, the coach may teach the game strategy to the user by communicating the goals or motives of the suggested move to the user, so that the user understands the logic behind maximizing the chances of winning the whole game, as opposed to simply performing a high-score move but compromising his or her overall position in the game.

In embodiments in which the coach is embodied as a person, such coach may interact with the player via a server (e.g., game interface server 110 or game production server 120) and a user device. In embodiments in which the coach is embodied as software or a process operating on one or more computing platforms, it may interact with a server operable to facilitate the game via an Application Programming Interface (API), or it can be a part of the server itself, or it can operate inside the user device 105 itself.

The following tables exemplify one possible structure of the coaching feature of the game in accordance with one embodiment. This structure supports the user purchasing a generic "coaching" advice from a software coach, or from a human coach. A human coach can participate in a generic coaching item, where the user purchasing it expects coaching advice from any coach, say on a first come first served basis. Or, the coach can designate their own item, where the user specifically purchases coaching advice from that coach. In some embodiments, a combination of these approaches may be used, where the user purchases coaching from a category of coaches, say "A rated" coaching or "B+ rated coaching". In such embodiments a user can be participating in multiple items as a coach. In accordance with some embodiments, a process may facilitate the player or players receiving the advice, instructions or tips from a coach by facilitating payment to the entity providing the suggestions. In accordance with some embodiments, a process may facilitate collection of payment for advice, instructions or tips, on behalf of the entity providing such. For example, the process may provide for holding the payment from a player in escrow until the advice, instructions or tips from the coach is (are) successfully output to the player and/or implemented in the game. The process may then distribute the payment to the coach at a later time.

In accordance with some embodiments, one or more tables may be utilized to store an indication of (i) users who are registered or qualified to serve as coaches for one or more games; (ii) payment information for such coaches; and/or (iii) tokens purchased by a player for use in obtaining advice, instructions or tips from a coach. Some example and non-limiting embodiments of tables which may be useful in embodiments involving a coach are illustrated and described below.

The table immediately below comprises one example embodiment of a User Coach table which defines information about one or more users who act as coaches for one or more games. In the table, a user and item may be stored as foreign keys to user_id and item_id of the user and item table respectively.

| | |
|---|---|
| Coach_id | Int |
| User | Int |
| Item | Int |
| Usage | Int |
| Amount_Accumulated | Float |
| Payments | Float |

As described herein, in embodiments in which a coach is embodied as a person (e.g., a user), a coach may be provided payment for serving as a coach (e.g., a periodic payment). For example, once a month (or some other period) a server process goes over the coach table, adds the differences of amount_accumulated payments for each coach, then if the total is above a threshold, for example $10, it initiates a payment to the user and adds a log in the coach_payment table plus assigns the payments made in the coach table by increasing the value of "payments" fields accordingly.

The "Payment Table" below comprises one example embodiment of a payment table which may be used to track and store payment information for a coach. It should be noted that in the table below user is a foreign key to the user_id field of the coach table above.

| | |
|---|---|
| Coach_payment_id | Int |
| User | Int |
| Amount | Float |
| Payment_made | time |

As described above, in some embodiments a coach may be embodied as software (e.g., an algorithm, application or module comprising a program to provide advice, instructions or tips to a user playing a game). The following tables exemplify one possible structure of the coaching feature embodied as software. This structure supports the user purchasing a generic "coaching" advice from a software coach. In this example the user buys tokens, which are then utilized to invoke the software coach. Every time the coach is involved, a certain number of tokens are subtracted from the user's token balance. Specifically, the "Purchases Table" below stores in indication of the tokens purchased by a particular user.

| | |
|---|---|
| Purchase_id | Int |
| User_id | Int |
| Tokens | Int |
| Timestamp | Time |

Additionally, in some embodiments a "Token Usage" table may be utilized to store and track an indication of the tokens usage of each user.

| | |
|---|---|
| User_id | Int |
| Tokens | Int |
| Timestamp | time |

Finally, a "Token Balance" table may be utilized to store and track the tokens available to each user, i.e., adding the tokens the user purchased and subtracting the tokens the user has spent or utilized.

| | |
|---|---|
| User_id | Int |
| Token_balance | Int |

It should be noted that in accordance with some embodiments, in addition or in lieu of being able to purchase tokens, a player may be allowed to earn or win tokens. For example, tokens may be awarded to a player on a random basis or as a reward for certain in-game behavior that is sought to be encouraged. In some embodiments, a new or novice player is automatically provided with a predetermined number of free tokens when first joining a game or registering with the game provider.

In accordance with various embodiments, a coach embodied as software may be operable to function in any of a multitude of ways. In one example embodiment the coach may first require the player to place a move on the board. The coach may then perform an exhaustive search of all available moves to the player and select the highest scoring move. In this case, the coach searches the game interface one element position at a time (e.g., in a grid or tiled configuration, starting from the top row and leftmost column, and progressing to the rightmost column of the top row, then moving to the leftmost column of the second row and progressing to the rightmost column, and so on until all rows and columns have been checked). For every position, the process may provide for determining whether (a) the position is empty and (b) there is a game element already placed in a neighboring position, i.e., directly to the left, to the right, up or down of the current position. If not, the coach proceeds to the next element position. If yes, then the coach checks whether there is a game element available on the player's rack that can be placed on a symbol position that would constitute a valid move, based on the game elements already placed on the game interface and the one or more positional rule(s) of the game. If not, then it proceeds to the next element position; if yes, then it records this candidate move in its memory and checks whether the move can be extended by placing one or more of the remaining available game elements on the player's rack. If yes, the coach adds this new candidate move to its memory and keeps iterating this process until the move can no longer be extended. In such a way the coach collects all the possible placements of the player at this particular turn. Then the coach orders all the moves from highest scoring to lowest scoring, and picks the highest scoring move. Subsequent to finding the best possible move, the coach computes the score for the player's current move and then computes the ratio of that move divided by the best possible move, if the best possible move's score is greater than 0. This ratio is then shown as a percentage from 0% (if the best possible move has 0 points) to 100% (if the player's move scores as many points as the best possible move) to the player.

In accordance with some embodiments, players may be allowed to purchase items or services associated with the game(s) described herein. In accordance with some embodiments, such items or services may be made available as in-app purchases, ad-free apps, clothing, physical boards, etc. In one embodiment, the items available for purchase may be customized or personalized for a user or user device. The table below is one example embodiment of how indications of items available for purchase may be stored:

| | |
|---|---|
| Item_id | Int |
| Name | Char(40) |
| Description | Char(128) |
| User_Device | Int |
| Price | Float |
| Created | Time |
| Last_modified | Time |
| Allowed_usage | Int |

In accordance with some embodiments, a player may be allowed to swap game elements during a move (e.g., with another player or with other game elements available from the central pool). For example, in some embodiments a process may provide for (i) receiving a request to swap at least one game element; (ii) receiving an indication of the at least one game element to be swapped; (iii) selecting the next game elements from the pool that will be used to replace the player's game elements (e.g., if there are more than a minimum number (e.g., 7 (seven)) game elements left on the pool, otherwise rejecting the request for a swap); (iv) returning the at least one returned game element into the pool (and, in some embodiments, reshuffling the pool); and (v) adjusting the one or more variables that hold the state of the game and saving them in a database (e.g., the game data database 223).

In accordance with some embodiments, a process may provide for generating a leaderboard of the top players among everyone playing a game or who has played a game of the game provider (e.g., the same game or different games, active games or inactive games, etc.). For example, the leaderboard may consist of the top 10 players. One way to calculate the leaderboard on a daily basis is by most games won in the last 5 days with a tie-breaker of highest average score difference. In this example the server computes the most games won in the trailing 120 hours (5 days) from a given time. The player with the most games won is at the top of the leaderboard, the player with the second most games won at the second position, and so on. In case of a tie, the player with the highest average difference in score from the opponents in the games that the player won is placed higher on the leaderboard.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present disclosure" and the like mean "one or more embodiments of the present disclosure."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget"

may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired. Some displays may be interactive and may include touch screen features or associated keypads as is well understood.

A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present disclosure.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. An apparatus for facilitating an electronic game, the apparatus comprising:
   a processor,
   a display device,
   an input device, and
   a first memory operable to communicate with the processor, the first memory storing a game program comprising instructions for directing the processor to manage an electronic game, wherein the processor is operable with the game program to:
   output, on the display device, an electronic game interface comprising a plurality of element positions available for placement of game elements;
   arrange, in a first part of the electronic interface, a plurality of game elements available for placement by a player within the plurality of element positions in making moves in the electronic game;
   recognize, for a move in the electronic game as indicated by the player using the input device, at least one game element to be evaluated for the move of the player, the at least one game element placed on an element position of the plurality of element positions of the electronic game interface, wherein recognizing the at least one game element to be evaluated comprises determining a particular element position on which the game element was placed, thereby recognizing a subject game element and a subject position of the game element;

generate a modification to the electronic game interface to indicate the move;

determine a numeral indicated on the at least one game element;

identify at least one other game element also placed on the electronic game interface in element positions within a predetermined positional relationship with respect to the subject position, thereby identifying related game elements;

determine a respective numeral indicated on at least one of the related game elements;

determine, based on the numeral of the subject game element and any respective numerals of the related game elements, whether the subject game element and the related game elements satisfy a required mathematical relationship, the required mathematical relationship comprising one of (i) a modulo (10) addition and (ii) a modulo (10) difference;

if the subject game element and the related game elements satisfy the required mathematical relationship, calculate a score for the move based on the subject numeral and the respective numerals of the related game elements; and modify the electronic game interface to indicate that the subject game element and the related game elements satisfy the required mathematical relationship.

2. The apparatus of claim 1, wherein at least one of the related game elements comprises a blank game element such that it has no numeral indicated thereon.

3. The apparatus of claim 1, wherein the electronic game comprises a multi-player game such that multiple players take turns placing game elements on the electronic game interface.

4. The apparatus of claim 3, wherein the subject game element was placed on the electronic game interface by a first player and at least one of the related game elements was placed on the electronic game interface by a second player.

5. The apparatus of claim 1, wherein the processor is further operable to access a second memory, the second memory storing a plurality of game elements available to be output to a player of the electronic game for placement on the electronic game interface.

6. The apparatus of claim 5, wherein the first memory comprises the second memory.

7. The apparatus of claim 5, wherein the processor is further operable with the game program to select from the second memory and output to the player a predetermined number of game elements as available for placement on the electronic game interface, the selecting being done on a random basis.

8. The apparatus of claim 5, wherein the processor is further operable with the game program to:

select from the second memory and output to the player a predetermined number of game elements at the beginning of the game, the game elements output to the player being available for placement by the player on the electronic game interface; and maintain throughout the game the predetermined number of game elements as available for placement by the player by replacing each game element placed by the player with an additional game element selected from the second memory after each move of the player.

9. The apparatus of claim 1, wherein the processor is further operable with the game program to:

receive a request from the player to swap at least one specified game element previously output to the player, which specified game element has not yet been placed by the player on the electronic game interface; and output to the player a replacement game element in exchange for the specified game element, the replacement game element being provided in lieu of the player's turn to place any game elements on the electronic game interface.

10. The apparatus of claim 9, wherein the processor is further operable with the game program to:

determine, after receiving the request and prior to outputting the replacement game element, a number of game elements remaining as available for output to players; and only outputting the replacement game element if the number of game elements remaining is greater than a predetermined minimum number.

11. The apparatus of claim 1, wherein the electronic game interface comprises a grid having a plurality of rows and columns, an intersection of a line and column comprising an element position, and wherein a given position being within a predetermined positional relationship with respect to the subject position comprises at least one of an immediately adjacent position and one position past the immediately adjacent position, each within one of a horizontal, vertical and diagonal line of the subject position.

12. The apparatus of claim 1, wherein the processor being operable with the game program to determine whether the subject game element and the related game elements satisfy a required mathematical relationship comprises the processor being operable with the program to take into account the order of the subject game element and the related game elements, from left to right and from top to bottom, wherein a related game element on the left of the subject game element or above the subject game element is considered to precede the subject game element.

13. The apparatus of claim 12, wherein the processor being operable with the game program to determine whether the subject game element and the related game elements satisfy a required mathematical relationship comprises the processor being operable with the game program to determine whether the subject game element is equal to the addition modulo a number of the two related game elements immediately preceding the subject game element.

14. The apparatus of claim 12, wherein the processor being operable with the game program to determine whether the subject game element and the related game elements satisfy a required mathematical relationship comprises the processor being operable with the game program to determine whether the difference modulo a number of the subject game element and a related adjacent game element is equal to 1.

15. The apparatus of claim 14, wherein the processor being operable with the game program to determine whether the difference modulo a number of the subject game element and a related adjacent game element is equal to 1 comprises the processor being operable with the game program to determine whether the difference is equal to 1 only on two adjacent game elements that are (i) not preceded by nor (ii) succeeded by any other game elements along the axis on which they are placed.

16. The apparatus of claim 1, wherein at least one element position of the plurality of element positions is associated with a multiplier such that the processor is operable with the program to apply the multiplier to at least the numeral of a game element placed on the at least one element position when calculating a score involving the game element so placed.

17. The apparatus of claim 1, wherein the processor is further operable with the game program to determine whether the at least one game elements to be evaluated satisfy at least one positional rule of the electronic game and, if the at least one game elements to be evaluated do not satisfy the at least one positional rule, rejecting the move.

18. The apparatus of claim 1, wherein the processor is further operable with the game program to output to the player information regarding a next move, wherein the information is based on input from a software module operable to determine the information, the information comprising at least one of a suggestion for a next move and an assessment of a characteristic of a move being considered by the player.

19. A non-transitory computer-readable medium storing instructions for directing a player device to facilitate a game, which instructions when executed by a processor of the player device cause the player device to:

output, on a display device of the player device, an electronic game interface comprising a plurality of element positions available for placement of game elements;

arrange, in a first part of the electronic interface, a plurality of game elements available for placement by a player within the plurality of element positions in making moves in the electronic game;

recognize, for a move in the electronic game as indicated by the player using an input device of the player device, at least one game element to be evaluated for the move of the player, the at least one game element placed on an element position of the plurality of element positions of the electronic game interface, wherein recognizing the at least one game element to be evaluated comprises determining a particular element position on which the game element was placed, thereby recognizing a subject game element and a subject position of the game element;

generate a modification to the electronic game interface to indicate the move;

determine a numeral indicated on the at least one game element;

identify at least one other game element also placed on the electronic game interface in element positions within a predetermined positional relationship with respect to the subject position, thereby identifying related game elements;

determine a respective numeral indicated on at least one of the related game elements;

determine, based on the numeral of the subject game element and any respective numerals of the related game elements, whether the subject game element and the related game elements satisfy a required mathematical relationship, the required mathematical relationship comprising one of (i) a modulo (10) addition and (ii) a modulo (10) difference;

if the subject game element and the related game elements satisfy the required mathematical relationship, calculate a score for the move based on the subject numeral and the respective numerals of the related game elements; and modify the electronic game interface to indicate that the subject game element and the related game elements satisfy the required mathematical relationship.

20. The non-transitory computer readable medium of claim 19, wherein the instructions causing the player device to determine whether the subject game element and the related game elements satisfy a required mathematical relationship comprises the instructions causing the player device to:

(i) take into account the order of the subject game element and the related game elements, from left to right and from top to bottom, wherein a related game element on the left of the subject game element or above the subject game element is considered to precede the subject game element; and (ii) determine whether the subject game element is equal to the addition modulo a number of the two related game elements immediately preceding the subject game element.

* * * * *